United States Patent
Huang et al.

(10) Patent No.: US 9,432,384 B2
(45) Date of Patent: Aug. 30, 2016

(54) METHODS AND NODES FOR VERIFICATION OF DATA

(71) Applicant: Telefonaktiebolaget L M Ericsson (publ), Stockholm (SE)

(72) Inventors: Vincent Huang, Sollentuna (SE); Yi Cheng, Sundbyberg (SE); András Méhes, Sundbyberg (SE); Mats Näslund, Bromma (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/441,880

(22) PCT Filed: Nov. 12, 2012

(86) PCT No.: PCT/SE2012/051233
§ 371 (c)(1),
(2) Date: May 11, 2015

(87) PCT Pub. No.: WO2014/074041
PCT Pub. Date: May 15, 2014

(65) Prior Publication Data
US 2015/0288704 A1      Oct. 8, 2015

(51) Int. Cl.
*G06F 21/00* (2013.01)
*H04L 29/06* (2006.01)
(Continued)

(52) U.S. Cl.
CPC .............. *H04L 63/126* (2013.01); *G06F 21/64* (2013.01); *H04L 9/3236* (2013.01); *H04L 63/08* (2013.01); *H04L 63/123* (2013.01); *H04L 2209/38* (2013.01)

(58) Field of Classification Search
CPC .................................................... H04L 63/126
See application file for complete search history.

(56) References Cited

U.S. PATENT DOCUMENTS

2008/0195865 A1*   8/2008   Nikander ............ H04L 63/0442
                                                              713/170
2008/0262798 A1*  10/2008   Kim ........................ H04L 67/12
                                                              702/189

(Continued)

OTHER PUBLICATIONS

PCT Notification of Transmittal of the International Search Report and the Written Opinion of the International Searching Authority or the Declaration for International application No. PCT/SE2012/051233, Nov. 28, 2013.

(Continued)

*Primary Examiner* — Morshed Mehedi
(74) *Attorney, Agent, or Firm* — Patents on Demand, P.A.; Brian K. Buchheit; Scott M. Garrett

(57) ABSTRACT

A first data handling node (304) is configured to verify data received in a data distribution network with multiple data handling nodes forming a distribution path of a network topology, by obtaining tag information from a hash server (306). The first data handling node (304) receives data (D3) and a hash tag (H3) from a second data handling node (302). The received data (D3) and hash tag (H3) have been generated by the second node based on a previous hash tag (H1, H2) generated by a preceding third data handling node (300a, 300b). The third node has delivered data (D1, D2) to the second node, and the received data (D3) has been generated by the second node based on the data (D1, D2) delivered by the third data handling node. The first data handling node (304) verifies the received data (D3) based on the tag information from the hash server, which indicates whether the received hash tag (H3) corresponds to a "valid hash tag" (Hx) which is calculated by applying a predefined hash algorithm on the previous hash tag (H1, H2). When the received tag corresponds to the valid tag, the data is verified as trustworthy and not faked or manipulated.

16 Claims, 6 Drawing Sheets

(51) Int. Cl.
*G06F 21/64* (2013.01)
*H04L 9/32* (2006.01)

(56) References Cited

U.S. PATENT DOCUMENTS

| | | | |
|---|---|---|---|
| 2009/0044013 A1* | 2/2009 | Zhu | G06Q 10/107 713/170 |
| 2010/0098090 A1* | 4/2010 | Westhoff | H04L 9/008 370/400 |
| 2010/0290617 A1 | 11/2010 | Nath | |
| 2011/0286596 A1* | 11/2011 | Gressel | H04L 9/0637 380/268 |
| 2012/0057702 A1* | 3/2012 | Minematsu | H04L 9/3242 380/255 |
| 2012/0324229 A1* | 12/2012 | Buldas | H04L 9/321 713/176 |

OTHER PUBLICATIONS

"Secure Hierarchical In-Network Aggregation in Sensor Networks" by Chan et al., 2006.

"Applying Secure Data Aggregation techniques for a Structure and Density Independent Group Based Key Management Protocol" by Kifayat et al., 2007.

EPO extended European search report for Application No. / U.S. Pat. No. 12888012.7-1870 / 2918057 PCT/SE2012051233, Oct. 21, 2015.

* cited by examiner

METHODS AND NODES FOR VERIFICATION OF DATA

PRIORITY

This nonprovisional application is a U.S. National Stage Filing under 35 U.S.C. §371 of International Patent Application Ser. No. PCT/SE2012/051233, filed Nov. 12, 2012, and entitled "METHODS AND NODES FOR VERIFICATION OF DATA."

TECHNICAL FIELD

The present disclosure relates generally to data handling nodes and methods therein, and a hash server and a method therein, for verifying and enabling verification of data in a data distribution network.

BACKGROUND

In the field of telecommunication, data distribution networks comprising various data generating nodes, such as sensors and devices, are sometimes employed to distribute often huge amounts of data in order to provide knowledge about different locations and environments to parties needing or wanting such sensor generated information. In this context, the term "sensors" is often used to denote any entities capable of registering or measuring some measurable metric or quantity, and of communicating the results, e.g. at regular intervals, by sending source data through the network. "Source data" is thus original data that has basically not been processed.

The source data may for example refer to some physical measure such as temperature or pressure for surveillance of an object or a space, or to some counted metric such as the number of passing cars for example. This source data can then be processed by data processing nodes in a data distribution network when having received the source data, to produce new data derived from the source data, e.g. by performing various calculations and compilations. An illustrative example could be to receive multiple temperature measurements at regular intervals from one or more sensors and then calculating an average temperature for a certain period which is then delivered to a surveillance centre.

It should further be noted that source data in this context is not limited to measurements of "tangible" physical quantities, but could also relate to more abstract information, such as e.g. market or business data, news information, software, media or content such as audio/video/games, etc. For example, in a software development process, data relating to software components may be generated by a plurality of source nodes, which data may then be combined and/or refined, and re-distributed by subsequent data processing nodes. Source data may further be generated and distributed by devices having some operational function. For example, a device may work as an actuator for mechanically operating a moving part such as a door, valve, gate, plunge, ram, etc. In that case, the generated source data may refer to some operational feature of the device, e.g. the number of times it has executed a task.

In the following description, the term "source node" will be used to represent any devices, sensors, detectors, actuators and other entities capable of generating and communicating source data, while a "data processing node" is a node that in some way processes received data, which could comprise source data and/or previously processed data, to generate new data for further distribution through the network. The new data may be dependent on local data as well which has been generated and/or previously stored by the data processing node.

FIG. 1 illustrates how data can propagate through a data distribution network where source nodes denoted "SN" generate and send source data which is received by data processing nodes 102, 104 denoted "PN". In this example, a data processing node 102 receives source data D from three source nodes 100a. The data processing node 102 then processes the received source data, and possibly also local data L, in order to generate some new data D' which is thus derived from the received source data D and from local data L if used. The data processing node 102 sends the new data D' to another data processing node 104 which performs more processing of the received data D' and possibly also of source data D received from other source nodes 100b, as indicated by dashed lines in the figure, and/or of processed data from other data processing nodes, not shown, and/or of its own local data, depending on configuration. A data processing node 102 may also act as source node itself by generating its own local source data which may be used as well for generating new data.

In this way, the data processing node 104 generates further new data D" which is thus derived both from the source data D and the previously processed data D'. In this example, the data processing node 104 delivers the resulting data D" to a "data receiving node" 106 denoted "RN". The nodes 102, 104 and 106 can thus be seen as direct or indirect users of the original source data D. It should be noted that both data processing nodes 102, 104 can also be regarded as data receiving nodes in this context which term is used to simply indicate that the nodes receive data from one or more preceding nodes. It can be understood that the above-illustrated distribution of data originating from various source nodes may be cascaded in any number of "hops" in a tree-like fashion along a data distribution path which could involve any number of nodes in the data distribution path.

In more detail, a given node in the network, e.g. node 104 in FIG. 1, may be regarded as the root of a topological tree, which tree corresponds to a data distribution path comprising the root and the topologically preceding nodes, i.e. the nodes 100a, 100b, 102 in this simplified example, having taken part in the data generation/distribution steps resulting in the data D" generated at this root node 104. The data D" may be further distributed to the node 106 as shown in the figure. The set of source nodes having generated source data can be regarded as the "leaves" of this tree, i.e. nodes 100a and 100b correspond to leaves, but the node 102 does not.

When data is processed and transferred along a distribution path with plural nodes, it may be of interest for any receivers of data to ensure that the received data is really valid and trustworthy and that it has not been manipulated of faked at some point along its distribution path. Today, it is not possible, at least in a simple and efficient way that is practical to implement, to make sure that the received data originates from reliable sources, nor to identify those sources and any processing nodes in-between.

Although various solutions are available for applying authentication and verification of transferred data in a single transfer hop, i.e. from one node to another, based on a trusted relationship between the two nodes, the validity of the data cannot be easily ensured over multiple hops or steps, unless all nodes in the path belong to a trusted "community" where all nodes and data consumers are trustworthy. This model can be quite difficult or even impossible to implement, particularly when a great number of diverse nodes and data consumers are involved in the data distribution network, possibly across multiple different countries. Even if this model is used, where basically all nodes share one or more keys, every node in a data distribution path would have to add their own authentication data to the transferred data to enable tracing of the data, resulting in excessive increase of bandwidth where the total size of the transferred data would grow with every transfer hop. While some end-to-end security solutions are known today for data distribution, these solutions may not be useful and easily applicable since it is necessary to allow intermediate nodes to modify the distributed data, thus breaking the end-to-end trust relation.

As a result, it is a problem that any receivers of data that has been processed and derived from original source data in any number of hops along a distribution path, have no satisfactory and practical way of ensuring authenticity and validity of the received data and/or the original source data, as well as any source nodes and processing nodes in-between, and it can therefore not be trusted that the received processed data is really valid.

SUMMARY

It is an object of embodiments described herein to address at least some of the problems and issues outlined above. For example, it is an object to enable verification of data when received by a data handling node in a network of data handling nodes. It is possible to achieve these objects and others by using methods and nodes as defined in the attached independent claims.

According to one aspect, a method is performed by a first data handling node for verifying data in a data distribution network with multiple data handling nodes forming a distribution path in a network topology. In this method, the first data handling node receives, from a second data handling node in the data distribution network, distributed data and a hash tag. The received hash tag has been generated based on at least one previous hash tag which the second data handling node has received from at least one preceding third data handling node in the distribution path. The at least one third data handling node has delivered data to the second data handling node, wherein the received distributed data has been generated by the second data handling node based on the data delivered by the at least one third data handling node. The received distributed data is dependent on source data generated by at least one source node in the distribution path. Further, the received distributed data and the received hash tag as well as the at least one previous hash tag are directly or indirectly based on the source data.

In other words, the source data has been used by a succeeding node for generating new data which in turn has been used by a further succeeding node for generating further new data, and so forth. In this way, consecutive nodes along the distribution path generate new data from received data in a chain-like manner such that the distributed data received by the first data handling node is dependent on the source data "backwards" in the distribution path.

The first data handling node then obtains tag information from a hash server which tag information can be used for verification of the received hash tag, wherein the at least one previous hash tag has been registered in the hash server.

The first data handling node further verifies the received distributed data based on the tag information from the hash server. The tag information indicates whether the hash tag received from the second data handling node corresponds to a valid hash tag calculated by applying a predefined hash algorithm on the at least one previous hash tag registered in the hash server. This verification of the received distributed data can be made according to different embodiments, to be described below.

The at least one source node that has generated source data for distribution has also generated a source hash tag based on the source data. Each consecutive hash tag generated by respective nodes in the distribution path is generated based on a preceding hash tag such that the source hash tag and also all hash tags generated from preceding hash tags are all directly or indirectly tied to the original source data via the source hash tag. The generated hash tags have also been registered in the hash server, which are somehow reflected in the tag information obtained from the hash server. Thereby, any data handling node down the distribution path is able to verify received distributed data when the source data from which it has been directly or indirectly generated is verified by the hash tags.

According to another aspect, a first data handling node is configured to verify data in a data distribution network with multiple data handling nodes forming a distribution path in a network topology. The data handling node comprises a receiving unit adapted to receive, from a second data handling node in the data distribution network, distributed data and a hash tag generated based on at least one previous hash tag received from at least one preceding third data handling node in the distribution path. The at least one third data handling node has delivered data to the second data handling node, wherein the received distributed data has been generated by the second data handling node based on the data delivered by the at least one third data handling node. The received distributed data is dependent on source data generated by at least one source node in the distribution path, and the received distributed data and the above hash tags are directly or indirectly based on the source data.

The data handling node also comprises an obtaining unit adapted to obtain tag information from a hash server which tag information can be used for verification of the received hash tag, wherein the at least one previous hash tag has been registered in the hash server.

The data handling node also comprises a verifying unit adapted to verify the received distributed data based on the tag information from the hash server. The tag information indicates whether the hash tag received from the second data handling node corresponds to a valid hash tag calculated by applying a predefined hash algorithm on the at least one previous hash tag registered in the hash server.

According to yet another aspect, a vehicle or vessel comprises the above-described first data handling node. According to further aspects, a computer program comprises computer readable code which, when run on a data handling node, causes the data handling node to behave as the above-described first data handling node. A computer program product further comprises a computer readable medium, wherein the above computer program is stored on the computer readable medium.

According to yet another aspect, a method is performed by a hash server for enabling verification of data in a data distribution network with multiple data handling nodes forming a data distribution path of a network topology. In this method, the hash server receives hash tags for registration, which hash tags are sent from at least some of the data handling nodes in the distribution path. The hash tags comprise a source hash tag originating from a source node having generated source data, and consecutive hash tags originating from succeeding data handling nodes situated after the source node in the distribution path. Each of the consecutive hash tags has been generated by a corresponding data handling node by applying a predefined hash algorithm on at least a hash tag received from an immediately preceding node in the distribution path.

The hash server further receives a request for tag information from a requesting data handling node of the data handling nodes, wherein the requesting data handling node has received data and a hash tag from an immediately preceding data handling node in the distribution path. The hash server also determines the tag information based on at least one of the hash tags originating from preceding data handling nodes situated before the requesting data handling node in the distribution path according to the determined network topology. The hash server then returns the determined tag information to the requesting data handling node, thereby enabling the requesting data handling node to use the tag information to verify its received data.

According to yet another aspect, a hash server is configured for enabling verification of data in a data distribution network with multiple data handling nodes forming a data distribution path of a network topology. The hash server comprises a first receiving unit adapted to receive hash tags for registration from at least some of the data handling nodes. The received hash tags comprise a source hash tag originating from a source node having generated source data, and consecutive hash tags originating from succeeding data handling nodes situated after the source node in the distribution path. Each of the consecutive hash tags has been generated by a corresponding data handling node by applying a predefined hash algorithm on at least a hash tag received from an immediately preceding node in the distribution path.

The hash server further comprises a second receiving unit adapted to receive a request for tag information from a requesting data handling node of the data handling nodes, wherein the requesting data handling node has received data and a hash tag from an immediately preceding data handling node in the distribution path.

The hash server also comprises a logic unit adapted to determine the tag information based on at least one of the hash tags originating from preceding data handling nodes situated before the requesting data handling node in the distribution path according to the determined network topology.

The second receiving unit is further adapted to return the determined tag information to the requesting data handling node, thereby enabling the requesting data handling node to use the tag information to verify its received data.

According to yet another aspect, a method is performed by a data handling node for enabling verification of data in a data distribution network with multiple data handling nodes forming a distribution path of a network topology. In this method, the data handling node receives, from a preceding data handling node in the distribution path, distributed data and a hash tag generated by the preceding data handling node. The data handling node then generates new data based on the received distributed data, and generates a new hash tag based on at least the received hash tag.

The data handling node further delivers the new data and the new hash tag to a subsequent data handling node, and sends the new hash tag to a hash server for registration. Thereby, the subsequent data handling node is enabled to verify the delivered new data based on tag information from the hash server, which tag information indicates whether the delivered new hash tag corresponds to a valid hash tag calculated by applying a predefined hash algorithm on at least one previous hash tag which has been generated by at least one preceding data handling node and registered in the hash server.

According to yet another aspect, a data handling node is configured to enable verification of data in a data distribution network with multiple data handling nodes forming a distribution path of a network topology. The data handling node comprises a receiving unit adapted to receive, from a preceding data handling node in the distribution path, distributed data and a hash tag generated by the preceding data handling node. The data handling node also comprises a first generating unit adapted to generate new data based on the received distributed data, and a second generating unit adapted to generate a new hash tag based on at least the received hash tag.

The data handling node also comprises a sending unit adapted to send the new data and the new hash tag to a subsequent data handling node. The second generating unit is further adapted to send the new hash tag to a hash server for registration. Thereby, the subsequent data handling node is enabled to verify the delivered new data based on tag information from the hash server, which tag information indicates whether the delivered new hash tag corresponds to a valid hash tag calculated by applying a predefined hash algorithm on at least one previous hash tag generated by at least one preceding data handling node and registered in the hash server.

The above methods and nodes may be configured and implemented according to different optional embodiments and features, which will be explained in the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
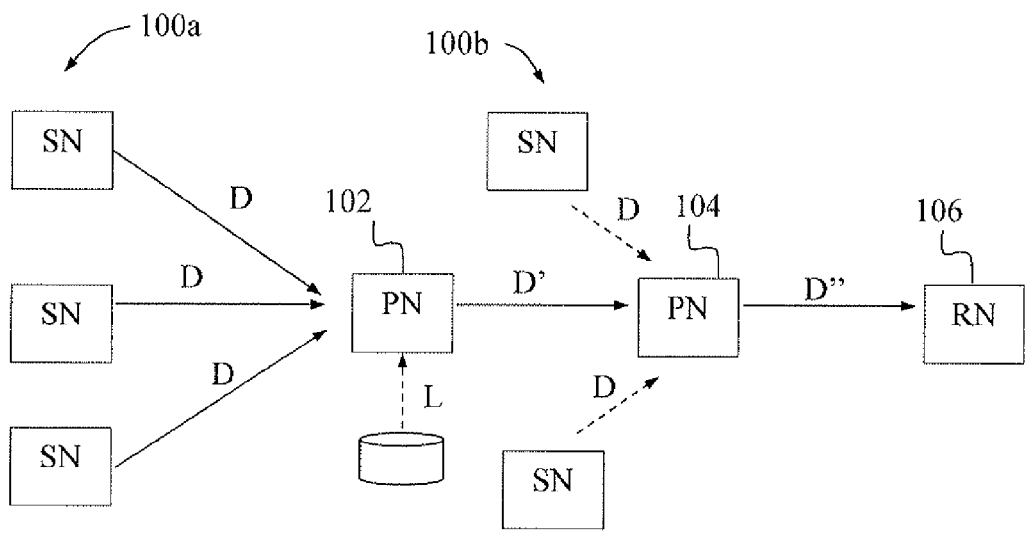
FIG. 1 is a communication scenario illustrating distribution and processing of data in a network, according to the prior art.

Briefly described, a solution is provided in a first data handling node to enable verification of whether distributed data, received from a preceding second data handling node in a data distribution network, is valid and can be trusted. It is assumed in this description that the data is processed and propagated in multiple steps by data handling nodes comprised in the data distribution network and forming a distribution path of a certain network topology, i.e. a pattern of data handling nodes connected to one another. It should be noted that the "first" data handling node in this description is not necessarily a source node where source data is generated at the beginning of the distribution path which source data is original data that has not been processed in any preceding node, but a node further down the distribution path which receives previously generated and processed data. It is however a possibility that the first data handling node may generate its own local data to be processed together with the received data.

The first data handling node also receives from the second data handling node a hash tag attached to the data. In some embodiments, the received hash tag has been generated by the second data handling node based on one or more previous hash tags which in turn have been generated by at least one earlier third data handling node when delivering data to the second data handling node. Alternatively or additionally, the second data handling node may be a source node having generated the received hash tag, based on its generated and distributed data, which tag could thus be denoted as a "source hash tag". In the examples described herein, a source node generating source data always generates a source hash tag based on the source data such that the source hash tag and also all hash tags generated from preceding hash tags are all directly or indirectly tied to the original source data. Thereby, any data handling node down the distribution path is able to verify received distributed data when the source data from which it has been generated is verified by the hash tags, which will be explained in more detail in the following examples.

The received hash tag may thus effectively be an aggregated hash tag in which multiple previous hash tags, generated one by one at the nodes earlier in the distribution path, are incorporated by generating each consecutive hash tag based on the immediately preceding hash tag, which will be explained in more detail later below. Thus, the generated hash tags are dependent on one another in a chain-like manner along the distribution path, also being dependent on and thus tied to the source data. The received distributed data may have been generated by the second data handling node at least based on the data delivered by the at least one third data handling node and possibly also based on locally generated source data and/or source data received from a source node. In this disclosure, it should be understood that when generally "a data handling node" or "a source node" is discussed here for simplicity it may in practice comprise one or several data handling nodes or source nodes, respectively, and the solution is not limited to just one node.

Figure 5:
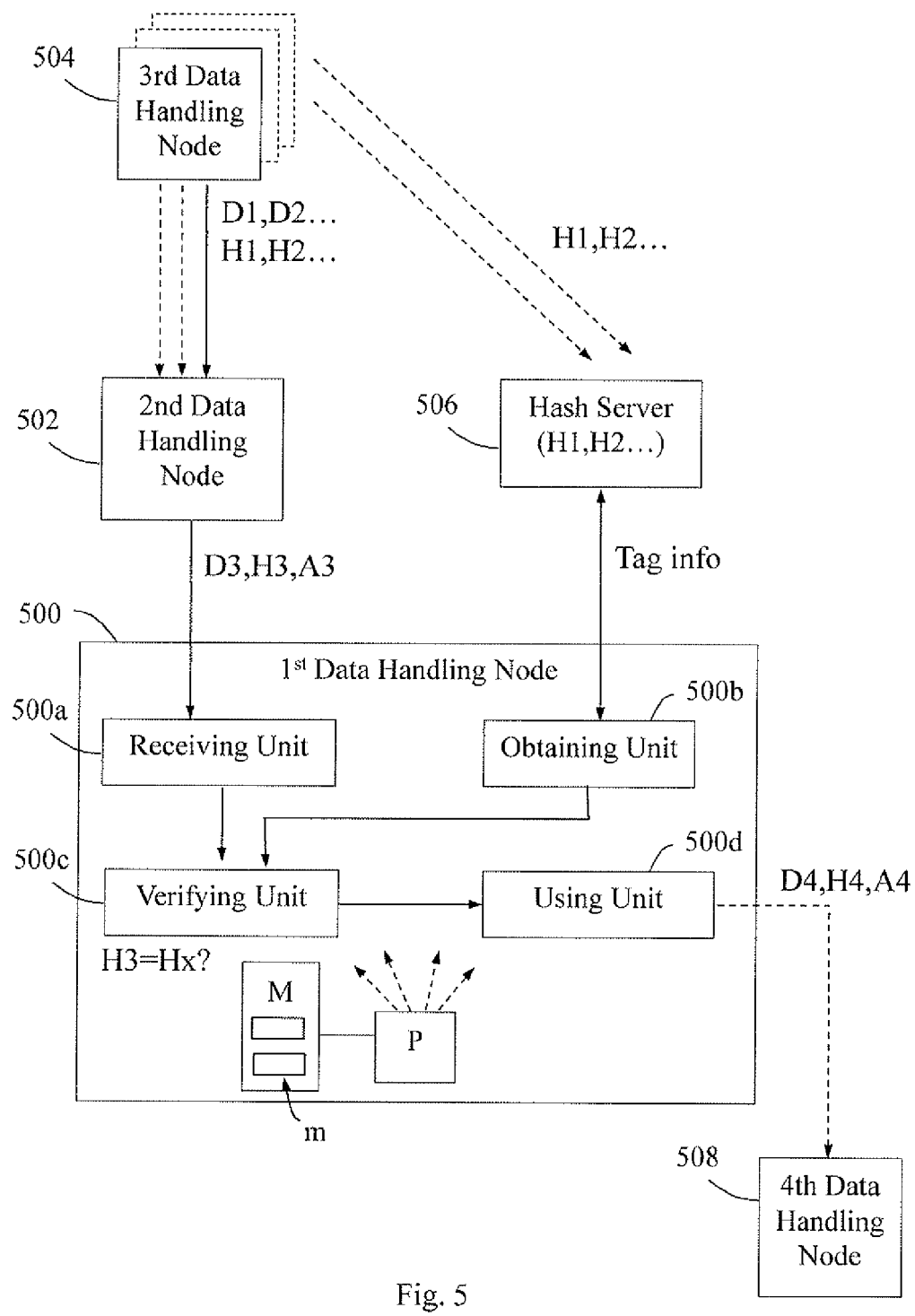
FIG. 5 is a block diagram illustrating a data handling node in more detail when used, according to further possible embodiments.
Figure 7:
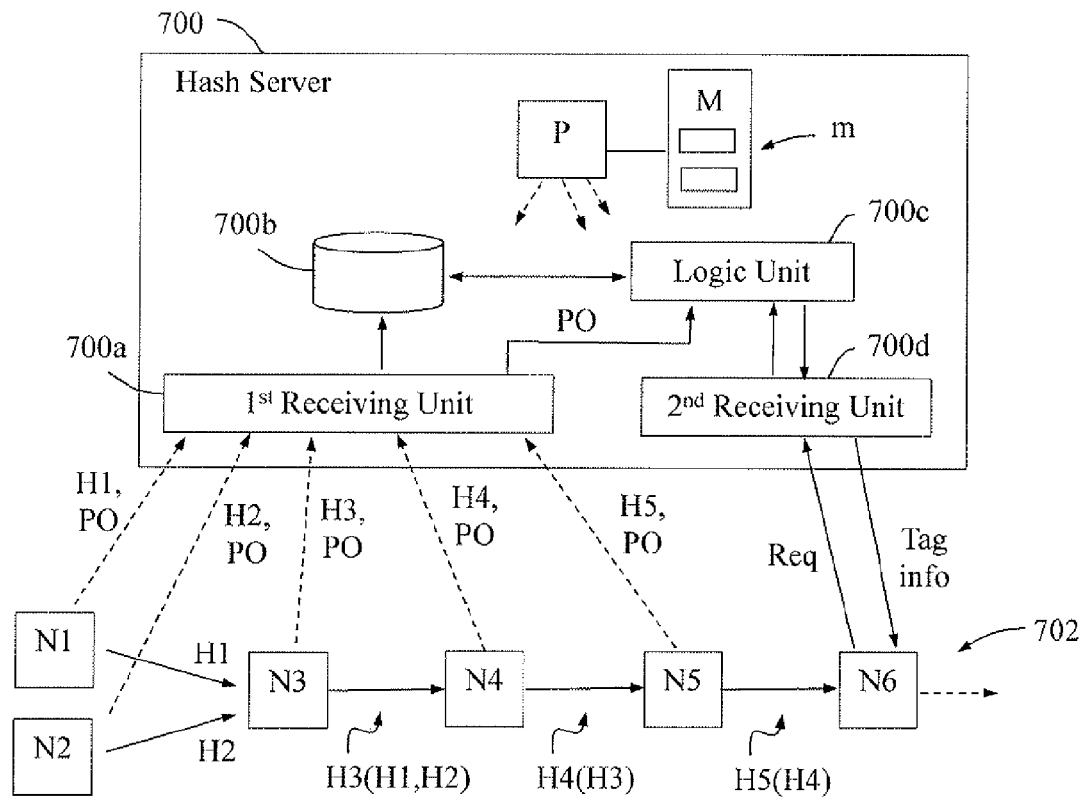
FIG. 7 is a block diagram illustrating a hash server in more detail when used, according to further possible embodiments.

An example of a procedure performed in a first data handling node for verifying received data, will now be described with reference to the flow chart in FIG. 2. It is assumed that the first data handling node is located in a data distribution network with multiple data handling nodes forming a distribution path of a network topology. The distribution path starts with one or more source nodes which generate source data that is distributed and processed in successive data handling nodes along the distribution path. Each of the one or more source nodes also generates a source hash tag based on the source data and the source hash tag is distributed with the source data. The protocol used for conveying data between the nodes may be any of the following known protocols: hypertext transfer protocol http, Real Time Protocol RTP, File Transfer Protocol FTP, and Constrained Application Protocol CoAP, although the solution is not limited to these examples. The distributed data could also comprise several different types of data, e.g. both video and various forms of telemetry, and different protocols could be used for different data types. The first data handling node may be situated somewhere down the path and there are thus a plurality of preceding data handling nodes, i.e. at least two nodes in this example, situated before the first data handling node in the distribution path. For example, the node 104 in FIG. 1 could act as the "first" data handling node described here. Further examples of distribution path are shown in FIGS. 3, 5 and 7.

In a first shown action 200, the first data handling node receives, from a second data handling node being a data handling node situated immediately before the first node in the data distribution path, distributed data and a hash tag. Here, the term "situated immediately before" does not exclude the possibility that in practice there may still be a node between the first and second nodes that just relays the data and the hash tag without processing, e.g. a bridge, repeater or relay, which can therefore be disregarded when considering this solution. The received hash tag has been generated by the second data handling node based on at least one previous hash tag which in turn has been generated by at least one preceding third data handling node situated immediately before the second node in the path, at least logically not excluding a possible relaying non-processing node in between here as well. The at least one third data handling node has delivered data to the second data handling node together with one of the previous hash tag(s). All these hash tags are thus dependent on and tied to the source data. It should be noted that generally an individual data handling node only needs to produce a single tag to be forwarded to the next data handling node.

Further, the distributed data received by the first data handling node in this action has been generated by the second data handling node based on the data delivered by the at least one third data handling node to the second data handling node. Further, the second data handling node may at the same time also be a source node in the sense of having generated the above received distributed data from a combination of its local source data and the data delivered by the at least one third data handling node, and the received hash tag may in that case be based on the local source data and the at least one previous hash tag. In either case, the received hash tag is tied to and indirectly or directly dependent on the source data and can therefore be used to verify the validity and truthfulness of that source data and of the received data.

A next action 202 illustrates that the first data handling node obtains tag information from a trusted hash server, which tag information can be used for verification of the hash tag received from the second data handling node. The at least one previous hash tag has been registered in the hash server by the respective preceding data handling node(s) in the distribution path. If the received hash tag is proved to be correct according to the tag information from the hash server, the received hash tag effectively also verifies the data delivered from the second data handling node since this data has been generated indirectly based on the original source data and the received hash tag is tied to that source data, as explained above. It is thus assumed that the tag information provided by the hash server can be trusted as genuine and not faked or manipulated.

Thus, another action 204 in this procedure illustrates that the first data handling node verifies the received distributed data based on the tag information obtained from the hash server. In more detail, the obtained tag information chiefly indicates whether the hash tag received from the second data handling node corresponds to a "valid hash tag" which is calculated, either by the first node or by the hash server, by applying a predefined hash algorithm, "A", on the at least one previous hash tag generated by the preceding data handling nodes in the distribution path. A is thus a cryptographic hash function. For example, the data may be verified if the received hash tag is equal to the calculated valid hash tag, or if they otherwise correspond to each other in a predefined way, which is indicated by the obtained tag information. In the general case, it may be required that a certain predefined relation "F" is true, which relation can be expressed as: F(received hash tag, valid hash tag), where F is the predefined relation. In a simple example, relation F(received hash tag, valid hash tag) is true only if received hash tag=valid hash tag.

If the received and valid hash tags do not correspond to one another, e.g. according to the relation F, the received data may be discarded since it has not been verified by the received hash tag. Nevertheless, the first data handling node may still decide to use the received data even though it has not been verified and thus cannot be trusted, which is however outside the scope of this solution.

In different possible embodiments, the valid hash tag may be calculated by the first data handling node or by the hash server, depending on the implementation. In one possible alternative, the tag information obtained from the hash server may comprise the registered at least one previous hash tag. In that case, the first data handling node calculates the valid hash tag by applying the predefined hash algorithm A on the registered at least one previous hash tag comprised in the obtained tag information, e.g. as A(registered tag . . . ). The first data handling node then compares the calculated valid hash tag with the received hash tag to determine whether they correspond to one another or not, e.g. whether A(registered tag . . . )=received tag.

In another possible alternative, the tag information obtained from the hash server may explicitly comprise the valid hash tag when it has been calculated by the hash server by using the predefined hash algorithm A in the manner described above. In that case, the first data handling node is able to compare the received valid hash tag with the hash tag received from the second data handling node for verification of the data. In yet another possible alternative, the tag information obtained from the hash server may simply comprise a direct confirmation, e.g. the outcome of F(received hash tag, valid hash tag), whether the hash tag received from the second data handling node corresponds to the valid hash tag or not, where the valid hash tag has been calculated by the hash server by using the predefined hash algorithm. In this example, the logic for comparing the calculated and received hash tags is thus performed by the hash server.

Figure 2:
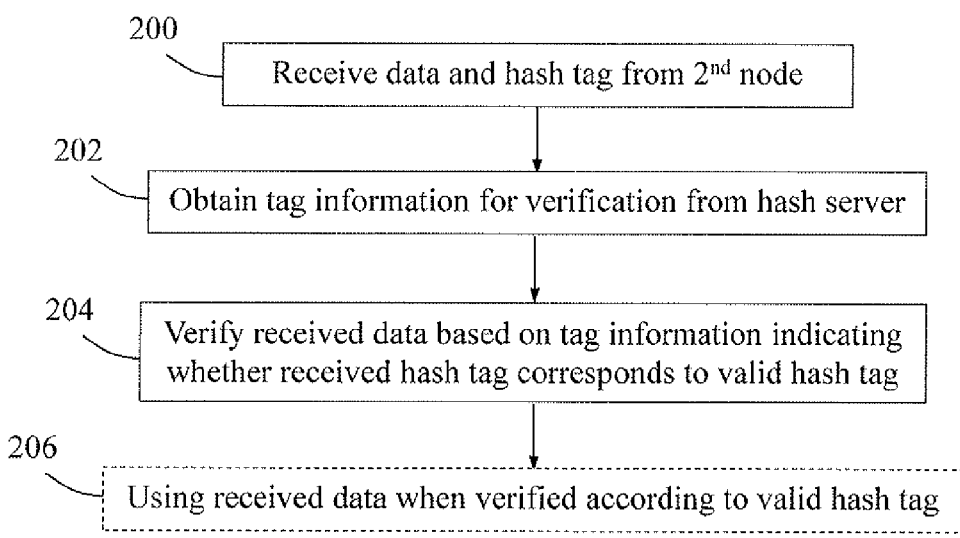
FIG. 2 is a flow chart illustrating a procedure in a data handling node, according to some possible embodiments.
Figure 3:
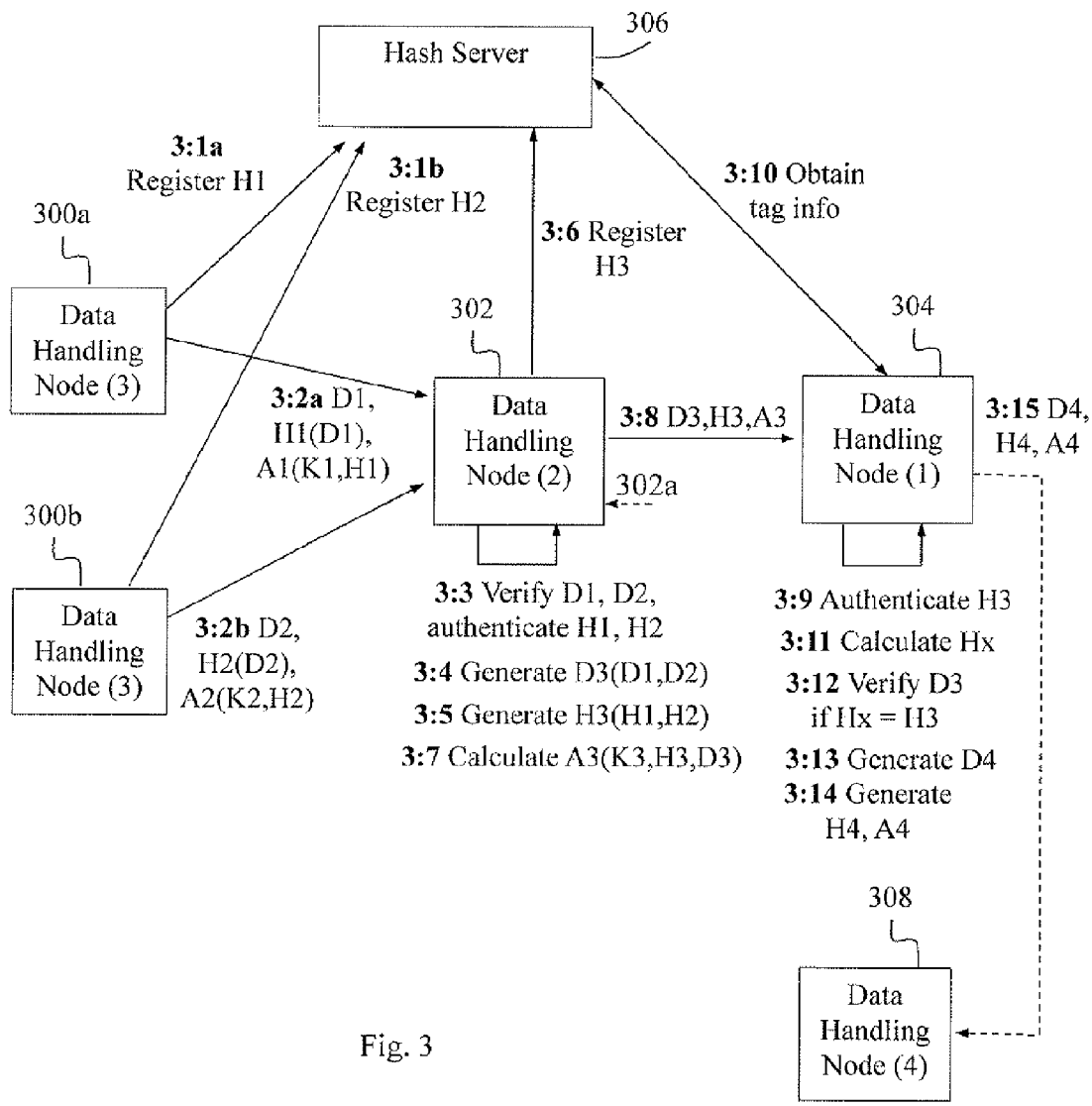
FIG. 3 is a block diagram illustrating distribution and verification of data, according to further possible embodiments.

Returning to the flow chart in FIG. 2, a final optional action 206 illustrates that the first data handling node may use the distributed data received from the second data handling node, when the received distributed data has been verified according to the valid hash tag. The first data handling node is thus able to use the received and verified data in different possible ways. In one embodiment, the first data handling node may use the received data by generating new data based on the received data for distribution to another data handling node further down the distribution path. In that case, the first data handling node generates a new hash tag based on at least the hash tag received from the second data handling node, which latter tag was verified in action 202 above. The first data handling node then delivers the new data and the new hash tag to a subsequent fourth data handling node. The first data handling node may further send the new hash tag to the hash server for registration.

The first data handling node may use the data in other ways than processing it further, and the solution is not limited in this respect. When the first data handling node is a final node in the distribution path, it may use the received data by performing or triggering some action or task according to the data. For example, if the data indicates excessive temperature in a power plant, the node may activate a cooling system, issue an alarm, or activate some controlling operation to counteract the temperature rise. Another example may be when the first data handling node is situated in a vehicle or vessel and the received data refers to some factor affecting the vehicle or vessel in some way, e.g. the weather or conditions relating to traffic, road, etc. In that case, the first data handling node may use the data for controlling the vehicle or vessel accordingly. Further, traffic data may be used to detect accidents. When a road accident is indicated by the received data, the reliability of the accident data can be verified by checking if the data originates from vehicles close to the accident site. Another example is when the data indicates some illicit or malicious activity by analyzing images from a camera. This solution enables verification of the data to ensure that the camera is reliable.

Further embodiments are possible to use in the above procedure, e.g. according to the following examples. In one example, the first data handling node may further receive an authentication value from the second data handling node, which authentication value has been calculated by the second data handling node based on the hash tag received by the first data handling node and a key known to the second data handling node. In that case, the first data handling node is able to use the authentication value to authenticate the received hash tag, to ensure that the hash tag is reliable and not delivered by some malicious party. Effectively, if the received authentication value proves to be correct, it contributes to the verification of the data itself as well. The key in this embodiment may be a shared key known to the first data handling node or a private key of the second data handling node corresponding to a public key known to the first data handling node, which keys may be used according to conventional procedures. In the latter case, the first data handling node may use the corresponding public key to verify the authentication value. In addition, the authentication value may be further based on the received distributed data.

It should be noted that verification of the authentication value ensures the first data handling node that the received data and hash tag are really received from the second data handling node and not from some other possibly malicious entity. Although verifying the authentication value does not imply that the received tag is "valid" as such, it can be advantageous since it ensures that the hash server is contacted by the first data handling node based on an authenticated hash tag that has been received from the second data handling node in both the hash server and the first data handling node.

In yet another possible embodiment, when delivering new data to a fourth data handling node as described above, the first data handling node may calculate a new authentication value at least based on the new hash tag it has generated and a key known to the first data handling node, and deliver the new authentication value to the fourth data handling node together with the new data and the new hash tag. Thereby, the fourth data handling node is enabled to authenticate the new hash tag by using the new authentication value, basically in the same way that was described for the first data handling node above.

An example of a possible scenario for distribution and verification of data by data handling nodes forming a distribution path of a network topology where the above-described embodiments can be used, will now be described with reference to the block diagram in FIG. 3. In this scenario, the data distribution path starts with two data handling nodes 300a and 300b which are source nodes generating source data D1 and D2, respectively, which data is delivered to a data handling node 302. The latter node 302 in turn is a data processing node that generates new data D3 based on the received source data D1 and D2, and delivers the generated data D3 to another data handling node 304. It is also possible that node 302 may generate the new data D3 further based on locally generated source data, schematically indicated by numeral 302a. Here, the data handling node 304 corresponds to the "first data handling node" in the example of FIG. 2, the data handling node 302 corresponds to the "second data handling node" described for FIG. 2, and the data handling nodes 300a,b correspond to the "at least one preceding third data handling node" described for FIG. 2.

A dashed arrow indicates that the data handling node 304 may further generate new data D4 based on the data D3 received from node 302, and deliver the new data D4 to yet another data handling node 308 which thus corresponds to the "subsequent fourth data handling node" described for FIG. 2. This figure also illustrates a hash server 306 where various hash tags are registered which can be retrieved and used by the data handling node 304 for verifying the received data D3 as follows. It is assumed that the hash server 306 is trustworthy and that hash tags provided therefrom can be deemed valid and not faked or manipulated.

Initially, the two data handling nodes 300a and 300b, being data source nodes, send their source hash tags H1 and H2, respectively, to the hash server 306 for registration, as shown by actions 3:1a and 3:1b. The hash tags H1 and H2 have been generated based on the respectively generated source data D1 and D2, e.g. using a predefined algorithm such as the above-described hash function A. It is also possible that the nodes 300a and 300b registers their source data D1 and D2 as well in the hash server which would enable a more thorough inspection of hash tags later on. Alternatively, source nodes 300a and 300b could save the source data locally in case of a later inspection.

Next, actions 3:2a and 3:2b illustrate that the data handling nodes 300a and 300b deliver their source data D1, D2 together with the hash tags H1, H2 and authentication values A1 and A2, respectively, to the next data handling node 302 in the path. It may also be possible that nodes 300a and 300b do not include their hash tags H1, H2 with the source data D1, D2 such that they can be retrieved from the hash server 306 anyway by the data handling node 302. The hash tags H1, H2 have thus been generated based on the respective source data D1, D2 and are therefore tied to the respective source data D1, D2. Further, the authentication values A1 and A2 have been calculated, using another predefined algorithm, based on the hash tags H1, H1 and respective keys K1 and K2, as indicated in the figure. Thereby, the hash tag H1 and authentication value A1 are tied to the source data D1 generated by the source node 300a, and correspondingly the hash tag H2 and authentication value A2 are tied to the source data D2 generated by the source node 300b. Each of the keys K1 and K2 may be a shared key known to the data handling node 302 or a private signature key of the data handling nodes 300a and 300b, respectively, corresponding to a public key known to the data handling node 302. In the latter case, the first data handling node may use the corresponding public key to verify the authentication values A1 and/or A2, respectively.

Having received the hash tags H1, H2 and the authentication values A1, A2 together with the data D1, D2 from the source nodes 300a and 300b, the data handling node 302 is able to authenticate the hash tags H1, H2 using the authentication values A1, A2, respectively, and also to verify the received data D1, D2 by the authenticated hash tags H1, H2, if desired. In this example, the received data D1, D2 is verified and the hash tags H1, H2 are authenticated accordingly in an action 3:3.

The data handling node 302 then generates new data D3 based on the received source data D1, D2, as shown by another action 3:4. The data handling node 302 also generates a new hash tag H3 based on the received hash tags H1, H2 and using the hash function A, as shown by next action 3:5. In this way, with A being a cryptographic hash function, the new hash tag H3 is indirectly based on, and thereby tied to, the source data since H3=A(H1, H2)=A(A(D1), A(D2)), it would be infeasible for any other source data, different from D1 and/or D2, to result in the same tag H3 as it would imply a collision in the hash function A.

Another action 3:6 illustrates that the data handling node 302 may send the generated new hash tag H3 to the hash server 306 for registration, even though this registration may be done otherwise as follows. A succeeding node in the transmission path, i.e. the next node 304, may alternatively send the hash tag H3 to server 306 for registration after having received it together with data from the node 302. As a result, it is not necessary that each and every node in the transmission path send their own generated hash tags to the server 306. It is thus possible that only some of all the nodes in the transmission path are connected to the hash server 306 for sending such hash tags thereto for registration.

When sending their hash tags to the hash server 306 for registration, the data handling nodes in the transmission path may also send position information indicating their respective positions in the distribution path. The position information may comprise information about one or more directly connected nodes. For example, node 302 may send position information to server 306 in action 3:6 indicating that node 302 is connected to the preceding nodes 300a, 300b and to the succeeding node 304. Thereby, the hash server 306 is enabled to determine the network topology based on the received position information of the nodes. The determined network topology will be used later by the hash server 306 to determine tag information, as will be described below.

Another action 3:7 illustrates that the data handling node 302 then calculates a new authentication value A3 based on at least the new hash tag H3 and a key K3 known to the first data handling node and optionally also based on the new data D3. The data handling node 302 finally delivers the new data D3 together with the new hash tag H3 and the new authentication value A3 to the next data handling node 304, in an action 3:8. The actions performed by this data handling node 304 correspond at least partly to the actions 200-206 of FIG. 2 described above, where action 3:8 including receiving D3, H3 and A3 corresponds to action 200.

In action 3:9, the data handling node 304 authenticates the received hash tag H3 by using the authentication value A3. If K3 is a shared key, the data handling node 304 may calculate the authentication value based on K3. K3 may for example be a shared key known to the data handling node 302 or a private key of the data handling node 302. If K3 is a private key, the data handling node 304 is able to authenticate the hash tag H3 by calculating the authentication value based on a corresponding public key according to conventional procedures.

Having authenticated the received hash tag H3, the data handling node 304 obtains tag information from the hash server 306 in another action 3:10, e.g. by sending a request for tag information or the like to server 306 and receiving a response with the tag information therefrom. This action basically corresponds to action 202 in FIG. 2. The obtained tag information can be used by node 304 for verifying the received data D3 as follows. In this example, the obtained tag information comprises the previous hash tags H1, H2, registered by the source nodes 300a, 300b in actions 3:1a and 3:1b. The data handling node 304 then calculates a valid hash tag Hx, in an action 3:11, by applying a predefined hash algorithm on the previous hash tags H1, H2 comprised in the obtained tag information. In some alternative embodiments, the valid hash tag Hx may be calculated by the hash server 306 instead, which embodiments were described above with reference to action 204.

In another action 3:12, the data handling node 304 compares the calculated valid hash tag Hx with the received hash tag H3. If the hash tags Hx and H3 correspond to one another, e.g. by equality or by some other predefined relation e.g. according to a predefined function F as described above for action 204, the received data D3 is verified. This action basically corresponds to action 204 in FIG. 2.

This calculation of a valid hash tag based on previous hash tags of nodes in the distribution path as obtained from the hash server 306, may be executed for data propagated and processed by any number of previous data handling nodes such that each hash tag generated by each node is derived "backwards" based on the next preceding hash tag throughout the distribution path. Thus, the successive hash tags generated along the path can be resolved backwards, step by step, in this way. All of these hash tags are also tied to the original source data by being generated directly or indirectly based on the source data, as explained above. For example, it may be desired to validate data originating from a particular node located somewhere down the path, and in that case it is only necessary to resolve the hash tags backwards until the hash tag of that node is reached. Further, if it is desired to verify data which is dependent on source data from a source node, it is necessary to resolve the hash tags all the way back to that source node. It is thus an advantage that received data can be verified by a receiving data handling node with respect to any number of freely selected preceding nodes in the distribution path. However, it is not required nor necessary that all intermediate nodes perform the verification of data. One or more of the nodes may thus refrain from performing the verification, which will be described in more detail with reference to FIGS. 8 and 9 below.

Another action 3:13 illustrates that the data handling node 304 uses the received data D3 when the data D3 has been verified according to the valid hash tag Hx, corresponding to action 206 in FIG. 2. In this example, the data handling node 304 uses the received data D3 by generating new data D4 based on the data D3. In another action 3:14, the data handling node 304 may also generate a new hash tag H4 based on the hash tag H3 received from data handling node 302, and may further calculate a new authentication value A4 at least based on the new hash tag H4 and a key K4, basically in the same manner as described for actions 3:5 and 3:7 above. The new hash tag H4 will be tied to the original source data D1, D2 as well since H4 is indirectly based on the source data D1, D2 by being generated based on H3 which in turn was generated based on H1 and H2 which in turn were generated based on D1 and D2, respectively.

Another action 3:15 illustrates that the data handling node 304 finally delivers the new data D4, the new hash tag H4 and the new authentication value A4 to another subsequent data handling node 308. The node 308 thus corresponds to the fourth data handling node mentioned above when describing action 206. The data handling node 304 may further send the new hash tag H4 to the hash server 306 for registration, not shown.

Figure 4:
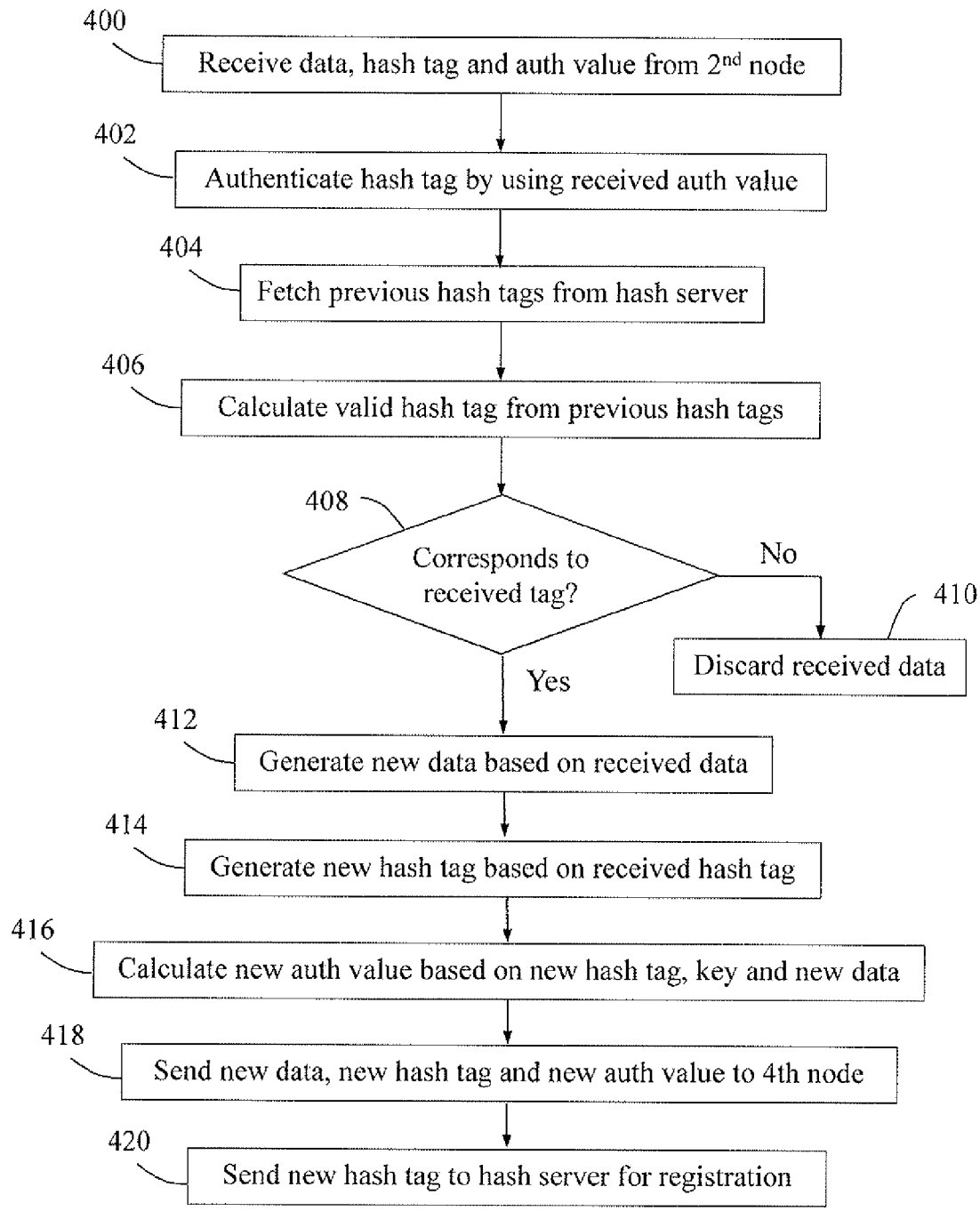
FIG. 4 is a flow chart illustrating a more detailed example of a procedure in a data handling node, according to further possible embodiments.

A detailed example of a procedure that may be performed by a first data handling node when using at least some of the above embodiments will now be described with reference to the flow chart in FIG. 4. Various actions in the forgoing examples will be referenced for further explanation. Similar to the example of FIG. 2, it is assumed that the first data handling node is located in a data distribution network with multiple data handling nodes forming a distribution path of a network topology, starting with at least one source node which generates source data that is distributed and processed in successive data handling nodes along the distribution path. It is also assumed that first data handling node chooses to perform validation of received data. The first data handling node performing this procedure may be situated in the path at a position where there is a plurality of preceding data handling nodes, i.e. at least two, situated before the first data handling node in the path.

In a first shown action 400, the first data handling node receives data, a hash tag and an authentication value from a preceding second data handling node, basically corresponding to actions 200 and 3:8 above. The first data handling node then authenticates the received hash tag by using the received authentication value, in an action 402, basically corresponding to action 3:9 above. In another action 404, the first data handling node fetches previous hash tags from a hash server, which tags have been generated and registered by preceding data handling nodes in the path, basically corresponding to actions 202 and 3:10 above.

The first data handling node then calculates a valid hash tag by applying a predefined hash algorithm on the fetched previous hash tags, in an action 406, basically corresponding to action 3:11 above. The first data handling node compares the calculated valid hash tag to the received hash tag to determine whether they correspond to one another, e.g. by equality, in a further action 408, basically corresponding to actions 204 and 3:12 above. If not, the received data cannot be verified as trustworthy, and the data is therefore discarded in an action 410. On the other hand, if the calculated valid hash tag corresponds to the received hash tag, the first data handling node is able to use the received and verified data by generating new data based on the received data, in another action 412. This action basically corresponds to actions 206 and 3:13 above.

A further action 414 illustrates that the first data handling node generates a new hash tag based on the hash tag received from the second data handling node. The first data handling node also calculates a new authentication value based on the new hash tag a key and the new data, in an action 416. Actions 414 and 416 basically correspond to action 3:14 above. In another action 418, the first data handling node sends the new data, the new hash tag and the new authentication value to a fourth data handling node situated after the first node in the distribution path, basically corresponding to action 3:15 above. A final action 420 illustrates that the first data handling node also sends the new hash tag to the hash server or registration, such that any data handling node situated after the first node in the distribution path can verify further processed and distributed data in the manner described herein.

As indicated above, the embodiments described herein may be implemented in a vehicle or vessel, e.g. the distributed and verified data may be used for controlling the vehicle or vessel accordingly, or for handling any other process, mechanism or apparatus. Further, a vehicle or vessel may comprise a first data handling node according to any of the above embodiments.

A detailed but non-limiting example of how a first data handling node may be configured to accomplish the above-described embodiments, is illustrated by the block diagram in FIG. 5. The first data handling node 500 is configured to verify data in a data distribution network with multiple data handling nodes forming a distribution path of a network topology. The data handling node 500 will now be described in terms of a possible example of employing the solution.

The data handling node 500 comprises a receiving unit 500a adapted to receive, from a second data handling node 502 in the data distribution network, distributed data D3 and a hash tag H3 generated by the second data handling node based on at least one previous hash tag H1, H2 . . . which in turn were generated by at least one preceding third data handling node 504. The at least one third data handling node 504 has delivered data D1, D2 . . . to the second data handling node 502, and the data D3 received by the node 500 has been generated by the second data handling node 502 based on the data D1, D2 . . . delivered by the at least one third data handling node 504.

The data handling node 500 also comprises an obtaining unit 600b adapted to obtain tag information from a trusted hash server 506, e.g. by sending a request for tag information or the like to the server 506, which tag information can be used for verification of the received hash tag H3. The at least one previous hash tag H1, H2 . . . has been registered in the hash server 506, as indicated by dashed arrows.

The data handling node 500 further comprises a verifying unit 500c adapted to verify the received distributed data D3 based on the tag information obtained from the hash server 506. The obtained tag information indicates, in some way, that the hash tag H3 received from the second data handling node 502 corresponds to a valid hash tag Hx which is calculated by applying a predefined hash algorithm on the at least one previous hash tag H1, H2 . . . , e.g. as explained in examples above. Some possible alternatives of how the obtained tag information can be used for the verification have been described above with reference to action 204. For example, the tag information may comprise the at least one previous hash tag H1, H2 . . . , or the valid hash tag Hx being calculated by the hash server 506, or a confirmation that the received hash tag H3 corresponds to the valid hash tag Hx calculated by the hash server. In the latter case, the data handling node 500 may need to send the received hash tag H3 to the hash server 506 e.g. in the above-mentioned request.

The data handling node 500 may also comprise a using unit 500d adapted to use the received distributed data D3 when the received distributed data has been verified according to the valid hash tag Hx. The data D3 can be used for generating new data, as further described above. In this way, the received data D3 can be trusted as being genuine and not faked or manipulated, and it can be assured that the data D3 has been generated based on reliable data generated earlier in the distribution path. It is also an advantage that verification of data based on successive hash tags can be made for a freely selected number of preceding steps in the distribution path, e.g. all the way back to one or more source nodes or to some intermediate node situated between the first node 500 and the source node(s).

The data handling node 500 and its functional units 500a-d may be configured or adapted to operate according to various optional embodiments. In a possible embodiment, the receiving unit 500a may be further adapted to also receive an authentication value A3 from the second data handling node 502, which authentication value has been calculated by the second data handling node based on the hash tag H3 received by the first data handling node and a key known to the second data handling node. In that case, the verifying unit 500c is further adapted to use the authentication value A3 to authenticate the received hash tag H3. Thereby, the hash tag H3 can be trusted as reliable and used for the verification of the received data D3.

In another possible embodiment, when the obtained tag information comprises the registered at least one previous hash tag H1, H2 . . . , the verifying unit 500c may be further adapted to calculate the valid hash tag Hx by applying the predefined hash algorithm on the at least one previous hash tag H1, H2 . . . comprised in the obtained tag information. In another possible embodiment, when the obtained tag information comprises the valid hash tag Hx as such being calculated by the hash server by using the predefined hash algorithm, the verifying unit 500c may be further adapted to compare the valid hash tag Hx with the hash tag H3 received from the second data handling node 502. In yet another possible embodiment, the obtained tag information may comprise a confirmation that the hash tag H3 received from the second data handling node corresponds to the valid hash tag Hx being calculated by the hash server by using the predefined hash algorithm.

In further possible embodiments, the using unit 500d may be further adapted to use the received distributed data D3 by generating new data D4 based on the received distributed data D3, to generate a new hash tag H4 based on at least the received hash tag H3, and to deliver the new data D4 and the new hash tag H4 to a subsequent fourth data handling node 508, as indicated by another dashed arrow in the figure. This enables the fourth data handling node 508 to verify the data D4 in a corresponding manner as described above.

In further possible embodiments, the using unit 500d may be further adapted to calculate a new authentication value at least based on the new hash tag H4 and a key known to the first data handling node, and to deliver the new authentication value A4 to the fourth data handling node 308, thereby enabling the fourth data handling node to authenticate the new hash tag H4 by using the new authentication value.

Figure 8:
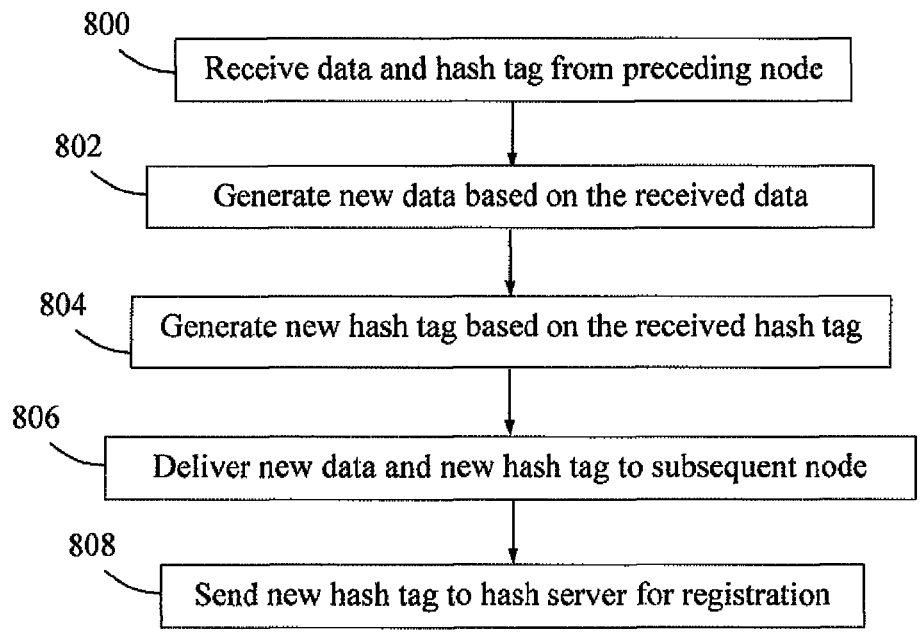
FIG. 8 is a flow chart illustrating a procedure in a data handling node, according to some possible embodiments.

The above-described embodiments may be implemented in a computer program comprising computer readable code which, when run on a data handling node, causes the data handling node to behave as a data handling node according to any of the above-described embodiments, such as the node 304 in FIG. 3 and/or the node 500 in FIG. 5. Further, the above-described embodiments may be implemented in a computer program product comprising a computer readable medium, and a computer program. The computer program product may be a compact disc 800, as shown in FIG. 8, or other entity suitable for holding the computer program. The computer program may also be downloadable e.g. from a software server or the like. The computer program comprises computer readable code which, when run on a data handling node, causes the data handling node to behave as a data handling node according to any of the above-described embodiments, such as the node 304 in FIG. 3 and/or the node 500 in FIG. 5. The computer program is stored on the computer readable medium. Some examples of how the computer program and computer program product can be realized in practice are provided later below.

Figure 6:
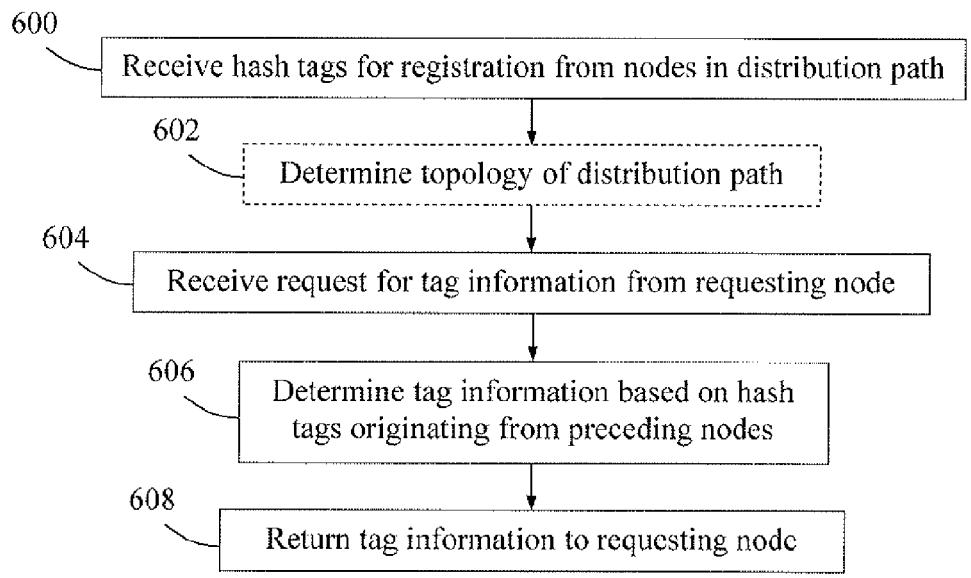
FIG. 6 is a flow chart illustrating a procedure in a hash server, according to some possible embodiments.

An exemplary procedure performed by a hash server, for enabling verification of data in a data distribution network with multiple data handling nodes forming a data distribution path of a network topology, will now be described with reference to the flow chart in FIG. 6. The hash server in this procedure may basically act as the hash servers 306 and 506 in FIGS. 3 and 5, respectively, or according to the examples described for FIGS. 2 and 4. A first action 600 illustrates that the hash server receives hash tags for registration, the hash tags being sent from at least some of the data handling nodes. The hash tags comprise a source hash tag originating from a source node having generated source data, and consecutive hash tags originating from succeeding data handling nodes situated after the source node in the distribution path.

The protocol used for conveying hash tags from the data handling nodes to the hash server may be any of the following known protocols: hypertext transfer protocol http, Real Time Protocol RTP, File Transfer Protocol FTP, and Constrained Application Protocol CoAP, although the solution is not limited to these examples. Each of the consecutive hash tags has been generated by a corresponding data handling node by applying a predefined hash algorithm on a hash tag received from an immediately preceding node in the path. It should be noted that more than one source nodes may be involved generating source data and source hash tags received in this action.

In a next optional action 602, the hash server may determine the network topology based on position information received with each hash tag, where the position information indicates a position of respective data handling nodes in the distribution path. For example, the position information may specify at least one preceding node and at least one subsequent node to which the respective data handling node is connected in the path. The network topology may form a tree structure, sometimes referred to as a "Merkle tree", in which a plurality of source nodes are leaves distributing source data down the path to other nodes forming branches in the tree structure. Alternatively, the network topology may be fixed and known in beforehand.

At some point later, the hash server receives a request for tag information from a requesting data handling node of the data handling nodes, in a further action 604. The requesting data handling node has received data and a hash tag from an immediately preceding data handling node in the distribution path. The hash server then determines the tag information based on at least one of the hash tags originating from preceding data handling nodes situated before the requesting data handling node in the distribution path according to the network topology, in another action 606. The hash server finally returns the determined tag information to the requesting data handling node, in a last shown action 608. Thereby, the requesting data handling node is enabled to use the tag information to verify its received data, basically in the manner described for the examples above with the actions performed by the "first data handling node".

An example of how a hash server may be configured to accomplish the above-described embodiments is illustrated by the block diagram in FIG. 7. The hash server 700 is configured to enable verification of data in a data distribution network with multiple data handling nodes 702 forming a data distribution path of a network topology, e.g. according to the procedures and features described above for any of FIGS. 2-6, respectively. The hash server 700 will now be described in terms of a possible example of employing the solution. The data distribution path in this example comprises two source nodes N1 and N2, and a plurality of subsequent data handling nodes N3, N4 . . . which process and distribute data which is dependent on source data generated by nodes N1 and N2. This example path is somewhat simplified having only two source nodes and a single line of successive data handling nodes, while a data distribution path in reality may comprise much more nodes connected to one another in a more or less complex pattern depending on the network topology.

The hash server 700 comprises a first receiving unit 700a which is adapted to receive hash tags H1, H2, H3 . . . for registration from at least some of the data handling nodes N1-N5. The registered hash tags comprise source hash tags H1, H2 originating from the source nodes N1, N2 having generated source data, and consecutive hash tags H3, H4, H5 generated by the subsequent data handling nodes N3, N4 and N5 which are thus situated after the source nodes N1, N2 in the distribution path. The first receiving unit 700a may also receive source data from Node N1 and/or node N2 for registration if desired, as described above for actions 3:1a and 3:1b. The hash tags H1-H5 are registered by storing them together with position information regarding the respective data handling nodes N1-N5 in a suitable storage unit 700b in the hash server 700. The nodes may provide such position information "PO" when sending the hash tags to server 700 for registration. Each of the consecutive hash tags H3, H4, H5 has been generated by a corresponding data handling node N3, N4 and N5, respectively, by applying a predefined hash algorithm on a hash tag received from an immediately preceding node in the distribution path.

In more detail, the source nodes N1 and N2 generate the source hash tags H1 and H2, respectively, which are registered in hash server 700 and delivered together with source data to the next node N3. The node N3 then generates its own hash tag H3 based on the previous source hash tags H1 and H2, and hash tag H3 is registered in hash server 700 and delivered together with processed data to the next node N4. In the same way, node N4 generates its own hash tag H4 based on the previous hash tag H3, and hash tag H4 is registered in hash server 700 and delivered together with further processed data to the next node N5. To continue, node N5 generates its own hash tag H5 based on the received previous hash tag H4, and hash tag H5 is likewise registered in hash server 700 and delivered together with further processed data to the next node N6. This process may be repeated for a number of further steps along the path with successive data handling nodes, each generating its own hash tag based on one or more received previous hash tags. All these hash tags can then be resolved backwards in the path by any one of the data handling nodes in the manner described above.

The hash server 700 further comprises a logic unit 700c which may be adapted to determine the network topology based on the position information PO received with each hash tag H1-H5, which position information indicates the position of the respective data handling nodes N1-N5 in the distribution path. The hash server 700 also comprises a second receiving unit 700d adapted to receive a request "Req" for tag information from a requesting data handling node N6 of the data handling nodes 702, wherein the requesting data handling node N6 has received data and a hash tag H5 from the immediately preceding data handling node N5 in the distribution path. The requesting data handling node N6 may refer to the received hash tag H5 or its topology position in the request.

When the request Req has been received from node N6, the logic unit 700c is further adapted to determine the tag information based on at least one of the hash tags originating from preceding data handling nodes situated before the requesting data handling node in the distribution path according to the network topology. The logic unit 700c is thus able to retrieve necessary information about the registered hash tags from the storage 700b, depending on the network topology, as shown by the two-way arrow in the figure. Finally, the second receiving unit 700d is further adapted to return the determined tag information "Tag info" to the requesting data handling node N6, thereby enabling the node N6 to use the tag information to verify its received data.

The hash server 700 and its functional units 700a-d may be configured or adapted to operate according to various optional embodiments. In a possible embodiment, the second receiving unit 700d may be further adapted to return one or more of the hash tags H1-H5 originating from the preceding data handling nodes N1-N5 as the tag information. In that case, the requesting data handling node will be enabled to perform verification by calculating a valid hash tag by applying the predefined hash algorithm on the returned one or more hash tags H1-H5 originating from the preceding data handling nodes, and comparing the valid hash tag with the hash tag received by the requesting data handling node.

In another possible embodiment, the logic unit 700c may be further adapted to calculate the valid hash tag by using the predefined hash algorithm, and the second receiving unit 700d is further adapted to return the calculated valid hash tag as the tag information. In that case, the requesting data handling node will be enabled to perform verification by comparing the returned valid hash tag with the hash tag received by the requesting data handling node.

In yet another possible embodiment, the logic unit 700c may be further adapted to calculate the valid hash tag by using the predefined hash algorithm, and to compare the calculated valid hash tag with the hash tag received by the requesting data handling node, and the second receiving unit 700d is further adapted to return the tag information comprising an indication indicating whether the hash tag received by the requesting data handling node corresponds to the valid hash tag.

It should be noted that FIG. 5 and FIG. 7 illustrate various functional units in the first data handling node 500 and in the hash server 700, and the skilled person is able to implement these functional units in practice using suitable software and hardware. Thus, the solution is generally not limited to the shown structures of the first data handling node 500 and the hash server 700, and the functional units 500a-d, 700a-d may be configured to operate according to the features described in this disclosure, where appropriate.

Figure 10:
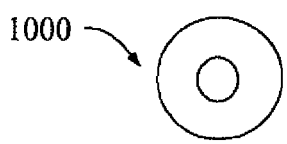
FIG. 10 illustrates a possible software product that may be used for implementing functionality in a data handling node.

The above-described embodiments may be implemented in a computer program comprising computer readable code which, when run on a data processing node, causes the data processing node to behave as a data processing node. Further, the above-described embodiments may be implemented in a computer program product comprising a computer readable medium, and a computer program. The computer program product may be a compact disc 1000, as shown in FIG. 10, or other entity suitable for holding the computer program. The computer program may also be downloadable e.g. from a server or the like. The computer program comprises computer readable code which, when run on a data processing node, causes the data processing node to behave as a data processing node such as the node 304 in FIG. 3 and/or the node 500 in FIG. 5. The computer program is stored on the computer readable medium. Some examples of how the computer program and computer program product can be realized in practice are provided below.

The functional units 500a-d, 700a-d described above can be implemented in the first data handling node 500 and the hash server 700, respectively, by means of program modules of a respective computer program comprising code means which, when run by a processor "P" in each node 500, 700 causes the first data handling node 500 and the hash server 700 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in the first data handling node 500 and the hash server 700, respectively, in the form of a memory "M" having a computer readable medium and being connected to the processor P. Each computer program product or memory M thus comprises a computer readable medium on which the computer program is stored e.g. in the form of computer program modules "m". For example, the memory M in either node 500, 700 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the first data handling node 500 and the hash server 700.

In the example scenarios described above, the "first" data handling node performs verification of received data. However, it is not necessary that all nodes in a data distribution path perform such verification of received data. One or more of the intermediate nodes situated anywhere between the source node(s) and the last data receiving node(s) in the path may thus refrain from performing the verification and may just generate a new hash tag from the received one and send the new hash tag to the hash server for registration. Thereby, any subsequent node in the path receiving distributed data is enabled to perform the verification of data, e.g. in accordance with the above description of actions by the "first" data handling node.

An exemplary procedure performed by a data handling node, for enabling verification of data in a data distribution network with multiple data handling nodes forming a distribution path of a network topology, will now be described with reference to the flow chart in FIG. 8. The data handling node in this procedure may basically act as the data handling node 302 in FIG. 3. A first action 800 illustrates that the data handling node receives, from a preceding data handling node in the distribution path, distributed data and a hash tag generated by the preceding data handling node. If the preceding data handling node is a source node having generated and distributed source data, the received hash tag has been generated based on the generated source data to tie the hash tag to the source data.

The data handling node then generates new data based on the received distributed data, and possibly also based on locally generated source data, in a following action 802, e.g. just as described for node 302 above. Another action 804 illustrates that the data handling node also generates a new hash tag based on the received hash tag. In this example, the data handling node refrains from performing verification of the received data and is content with generating the new hash tag to enable verification further down the path.

In a further action 806, the data handling node delivers the generated new data and new hash tag to a subsequent data handling node in the distribution path. The data handling node also sends the new hash tag to a hash server for registration, in a final shown action 808. Thereby, the subsequent data handling node, and possibly further subsequent data handling nodes down the path, is/are enabled to verify the delivered new data based on tag information from the hash server, which tag information indicates whether the delivered new hash tag corresponds to a valid hash tag calculated by applying a predefined hash algorithm on at least one previous hash tag generated by at least one preceding data handling node and registered in the hash server. In order to accomplish this, the subsequent data handling node(s) is/are able to act as described in connection with any of FIGS. 2-5 above.

Figure 9:
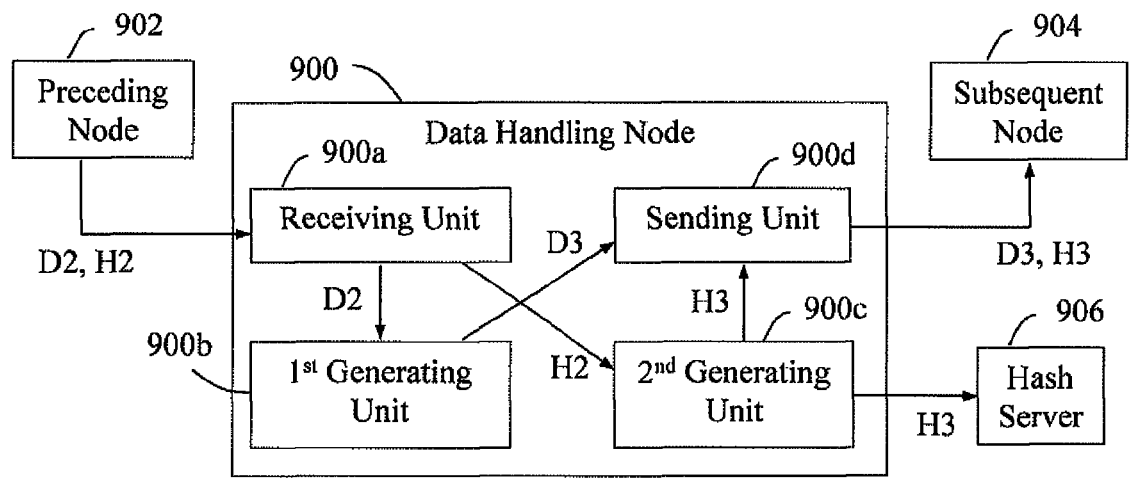
FIG. 9 is a block diagram illustrating a data handling node in more detail when used, according to further possible embodiments.

An example of how a data handling node may be configured to accomplish the above-described embodiments is illustrated by the block diagram in FIG. 9. The data handling node 900 is configured to enable verification of data in a data distribution network with multiple data handling nodes forming a distribution path of a network topology, e.g. according to the actions and features described above for FIG. 8. The data handling node 900 will now be described in terms of a possible example of employing the solution. In this example, the data handling node 900 is connected to a preceding data handling node 902 from which it receives distributed data, and to a subsequent data handling node 904 to which it sends new data. The shown nodes 900-904 thus form at least a part of the data distribution path.

The data handling node 900 comprises a receiving unit 900a adapted to receive, from the preceding data handling node 902 in the distribution path, distributed data D2 and a hash tag H2 generated by the preceding data handling node. The references D2 and H2 are used here to indicate how this example may correspond to the example illustrated in FIG. 3, more specifically the behavior of the node 302 therein. The data handling node 900 further comprises a first generating unit 900b adapted to generate new data D3 based on the received distributed data D2, and a second generating unit 900c adapted to generate a new hash tag H3 based on the received hash tag H2.

The data handling node 900 also comprises a sending unit 900d adapted to send the new data D3 and the new hash tag H3 to the subsequent data handling node 904 in the data distribution path. The second generating unit 900c is further adapted to send the new hash tag H3 to a hash server 906 for registration. Thereby, the subsequent data handling node 904 is enabled to verify the delivered new data D3 based on tag information from the hash server, said tag information indicating whether the delivered new hash tag H3 corresponds to a valid hash tag calculated by applying a predefined hash algorithm on at least one previous hash tag generated by at least one preceding data handling node and registered in the hash server.

In a possible embodiment, the sending unit 900d may be further adapted to calculate an authentication value at least based on the new hash tag and a key known to the data handling node, and to deliver the new authentication value to the subsequent data handling node 904, thereby enabling the subsequent data handling node to authenticate the new hash tag by using the new authentication value. This feature was also described above in connection with actions 3:7, 3:9, 402 and 416 in FIGS. 3 and 4, respectively.

While the solution has been described with reference to specific examples of embodiments, the description is generally only intended to illustrate the inventive concept and should not be taken as limiting the scope of the solution. For example, the terms "source data", "data handling node", "data distribution path", "hash server", "hash tag" and "authentication value" have been used throughout this description, although any other corresponding entities, functions, and/or parameters could also be used having the features and characteristics described here. The solution is defined by the appended claims.

The invention claimed is:

1. A method performed by a first data handling node for verifying data in a data distribution network with multiple data handling nodes forming a distribution path in a network topology, the method comprising:

receiving, from a second data handling node in the data distribution network, distributed data and a hash tag generated based on at least one previous hash tag received from at least one preceding third data handling node in the distribution path, the at least one third data handling node having delivered data to the second data handling node, wherein the received distributed data has been generated by the second data handling node based on the data delivered by the at least one third data handling node, wherein the received distributed data is dependent on source data generated by at least one source node in the distribution path, and wherein said received distributed data and said hash tags are directly or indirectly based on the source data, obtaining tag information from a hash server which tag information is used for verification of the received hash tag, wherein said at least one previous hash tag has been registered in the hash server, and verifying the received distributed data based on the tag information from the hash server, said tag information indicating whether the hash tag received from the second data handling node corresponds to a valid hash tag calculated by applying a predefined hash algorithm on the at least one previous hash tag registered in the hash server.

2. The method according to claim 1, wherein an authentication value is received from the second data handling node, wherein the authentication value has been calculated by the second data handling node based on the hash tag received by the first data handling node and a key to the second data handling node, and wherein the first data handling node uses the authentication value to authenticate the received hash tag.

3. The method according to claim 2, wherein the authentication value is further based on the received distributed data.

4. The method according to claim 1, wherein the obtained tag information comprises the registered at least one previous hash tag, and the first data handling node calculates the valid hash tag by applying the predefined hash algorithm on the registered at least one previous hash tag comprised in the obtained tag information.

5. The method according to claim 1, wherein the obtained tag information comprises the valid hash tag being calculated by the hash server by using the predefined hash algorithm, and the first data handling node compares the valid hash tag with the hash tag received from the second data handling node.

6. The method according to claim 1, wherein the obtained tag information comprises a confirmation that the hash tag received from the second data handling node corresponds to the valid hash tag being calculated by the hash server by using the predefined hash algorithm.

7. A first data handling node configured to verify data in a data distribution network with multiple data handling nodes forming a distribution path in a network topology, the first data handling node comprising:

a receiving unit adapted to receive, from a second data handling node in the data distribution network, distributed data and a hash tag generated based on at least one previous hash tag received from at least one preceding third data handling node in the distribution path, the at least one third data handling node having delivered data to the second data handling node, wherein the received distributed data has been generated by the second data handling node based on the data delivered by the at least one third data handling node, wherein the received distributed data is dependent on source data generated by at least one source node in the distribution path, and wherein said received distributed data and said hash tags are directly or indirectly based on the source data, an obtaining unit adapted to obtain tag information from a hash server which tag information is used for verification of the received hash tag, wherein said at least one previous hash tag has been registered in the hash server, and a verifying unit adapted to verify the received distributed data based on the tag information from the hash server, said tag information indicating whether the hash tag received from the second data handling node corresponds to a valid hash tag calculated by applying a predefined hash algorithm on the at least one previous hash tag registered in the hash server.

8. A computer program comprising computer readable code which, when run on a data handling node, which comprising a non-transitory computer readable medium, causes the data handling node to receive, from a second data handling node in the data distribution network, distributed data and a hash tag generated based on at least one previous hash tag received from at least one preceding third data handling node in the distribution path, the at least one third data handling node having delivered data to the second data handling node, wherein the received distributed data has been generated by the second data handling node based on the data delivered by the at least one third data handling node, wherein the received distributed data is dependent on source data generated by at least one source node in the distribution path, and wherein said received distributed data and said hash tags are directly or indirectly based on the source data;
   obtain tag information from a hash server which tag information is used for verification of the received hash tag, wherein said at least one previous hash tag has been registered in the hash server; and
   verify the received distributed data based on the tag information from the hash server, said tag information indicating whether the hash tag received from the second data handling node corresponds to a valid hash tag calculated by applying a predefined hash algorithm on the at least one previous hash tag registered in the hash server.

9. A computer program product comprising a non-transitory computer readable medium, and a computer program, wherein the computer program is stored on the computer readable medium, and wherein the computer program comprises computer readable code which, when run on a data handling node, causes the data handling node to
   receive, from a second data handling node in the data distribution network, distributed data and a hash tag generated based on at least one previous hash tag received from at least one preceding third data handling node in the distribution path, the at least one third data handling node having delivered data to the second data handling node, wherein the received distributed data has been generated by the second data handling node based on the data delivered by the at least one third data handling node, wherein the received distributed data is dependent on source data generated by at least one source node in the distribution path, and wherein said received distributed data and said hash tags are directly or indirectly based on the source data;
   obtain tag information from a hash server which tag information is used for verification of the received hash tag, wherein said at least one previous hash tag has been registered in the hash server; and
   verify the received distributed data based on the tag information from the hash server, said tag information indicating whether the hash tag received from the second data handling node corresponds to a valid hash tag calculated by applying a predefined hash algorithm on the at least one previous hash tag registered in the hash server.

10. A method performed by a hash server for enabling verification of data in a data distribution network with multiple data handling nodes forming a data distribution path of a network topology, the method comprising:
   receiving hash tags for registration, sent from at least some of the data handling nodes, said hash tags comprising a source hash tag originating from a source node having generated source data, and consecutive hash tags originating from succeeding data handling nodes situated after the source node in the distribution path, wherein each of the consecutive hash tags has been generated by a corresponding data handling node by applying a predefined hash algorithm on at least a hash tag received from an immediately preceding node in the distribution path,
   receiving a request for tag information from a requesting data handling node of the data handling nodes, wherein the requesting data handling node has received data and a hash tag from an immediately preceding data handling node in the distribution path,
   determining the tag information based on at least one of the hash tags originating from preceding data handling nodes situated before the requesting data handling node in the distribution path according to the determined network topology, and
   returning the determined tag information to the requesting data handling node for enabling the requesting data handling node to use the tag information to verify the received data.

11. The method according to claim 10, wherein the returned tag information comprises at least one of the hash tags originating from the preceding data handling nodes, thus enabling the requesting data handling node to perform verification by calculating a valid hash tag by applying the predefined hash algorithm on the at least one hash tag originating from the preceding data handling nodes, and comparing the valid hash tag with the hash tag received by the requesting data handling node.

12. The method according to claim 10, wherein the returned tag information comprises a valid hash tag calculated by the hash server by using the predefined hash algorithm, thus enabling the requesting data handling node to perform verification by comparing the valid hash tag with the hash tag received by the requesting data handling node.

13. The method according to claim 10, wherein the returned tag information comprises an indication whether the hash tag received by the requesting data handling node corresponds to the valid hash tag being calculated by the hash server by using the predefined hash algorithm.

14. A hash server configured for enabling verification of data in a data distribution network with multiple data handling nodes forming a data distribution path of a network topology, the hash server comprising:
   a first receiving unit adapted to receive hash tags for registration from at least some of the data handling nodes, said hash tags comprising a source hash tag originating from a source node having generated source data, and consecutive hash tags originating from succeeding data handling nodes situated after the source node in the distribution path, wherein each of the consecutive hash tags has been generated by a corresponding data handling node by applying a predefined hash algorithm on at least a hash tag received from an immediately preceding node in the distribution path,
   a second receiving unit adapted to receive a request for tag information from a requesting data handling node of the data handling nodes, wherein the requesting data handling node has received data and a hash tag from an immediately preceding data handling node in the distribution path, and a logic unit adapted to determine the tag information based on at least one of the hash tags originating from preceding data handling nodes situated before the requesting data handling node in the distribution path according to the determined network topology, wherein the second receiving unit is further adapted to return the determined tag information to the requesting data handling node, thereby enabling the requesting data handling node to use the tag information to verify the received data.

15. A method performed by a data handling node for enabling verification of data in a data distribution network with multiple data handling nodes forming a distribution path of a network topology, the method comprising:

receiving from a preceding data handling node in the distribution path, distributed data and a hash tag generated by the preceding data handling node, generating new data based on the received distributed data, generating a new hash tag based on at least the received hash tag, delivering the new data and the new hash tag to a subsequent data handling node, and sending the new hash tag to a hash server for registration for enabling the subsequent data handling node to verify the delivered new data based on tag information from the hash server, said tag information indicating whether the delivered new hash tag corresponds to a valid hash tag calculated by applying a predefined hash algorithm on at least one previous hash tag generated by at least one preceding data handling node and registered in the hash server.

16. A data handling node configured to enable verification of data in a data distribution network with multiple data handling nodes forming a distribution path of a network topology, the data handling node comprising:

a receiving unit adapted to receive, from a preceding data handling node in the distribution path, distributed data and a hash tag generated by the preceding data handling node, a first generating unit adapted to generate new data based on the received distributed data, a second generating unit adapted to generate a new hash tag based on at least the received hash tag, and a sending unit adapted to send the new data and the new hash tag to a subsequent data handling node, wherein the second generating unit is further adapted to send the new hash tag to a hash server for registration for enabling the subsequent data handling node to verify the delivered new data based on tag information from the hash server, said tag information indicating whether the delivered new hash tag corresponds to a valid hash tag calculated by applying a predefined hash algorithm on at least one previous hash tag generated by at least one preceding data handling node and registered in the hash server.

* * * * *